United States Patent [19]

Miyoshi et al.

[11] Patent Number: 4,984,081
[45] Date of Patent: Jan. 8, 1991

[54] APPARATUS FOR RECEIVING AND SELECTING HIGH-DEFINITION TELEVISION (HDTV) SIGNALS AND STANDARD TELEVISION (NTSC) SIGNALS

[75] Inventors: Toshihiro Miyoshi, Osaka; Masahiro Kawashima, Takatsuki; Hideyuki Ikuhara, Suita; Tetsuo Kutsuki, Toyonaka; Kazuyasu Yamamoto, Minoo, all of Japan

[73] Assignee: Matsushita Electric Industrial Co., Ltd., Osaka, Japan

[21] Appl. No.: 301,034

[22] Filed: Jan. 24, 1989

[51] Int. Cl.⁵ .......................... H04N 5/46; H04N 7/01; H04N 3/27
[52] U.S. Cl. ..................... 358/180; 358/140; 358/181
[58] Field of Search ............... 358/140, 141, 180, 181, 358/183

[56] References Cited

U.S. PATENT DOCUMENTS

| | | | |
|---|---|---|---|
| 4,394,690 | 7/1983 | Kobayash | 358/180 |
| 4,729,012 | 3/1988 | Jose et al. | 358/140 X |
| 4,794,456 | 12/1988 | Tsinberg | 358/140 X |
| 4,864,405 | 9/1989 | Chambers | 358/180 |

FOREIGN PATENT DOCUMENTS 63-146672  6/1988  Japan .

Primary Examiner—James J. Groody
Assistant Examiner—Mark R. Powell
Attorney, Agent, or Firm—Wenderoth, Lind & Ponack

[57] ABSTRACT

An apparatus for receiving and selecting high-definition television signals and NTSC standard television signals includes a high-definition display screen device having an aspect ratio of 16 to 9. The NTSC standard television signals have an aspect ratio which is different than the 16 to 9 aspect ratio of the high-definition display screen device. A first signal converter is for converting the NTSC standard television signals into first quasi-high-definition television signals identifying a first displayed image corresponding in vertical length to a vertical length of the high-definition display screen device. A second signal converter is for converting the NTSC standard television signals into second quasi-high-definition television signals identifying a second displayed image corresponding in horizontal length to a horizontal length of the high-definition display screen device. Switching circuits are provided for selecting one of the high-definition television signals and the first and second quasi-high-definition television signals.

1 Claim, 2 Drawing Sheets

FIG. 2-a
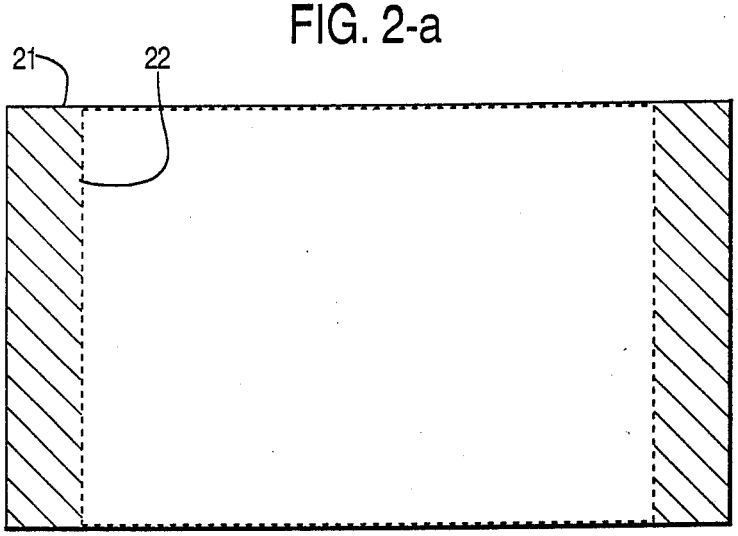
FIG. 2-b
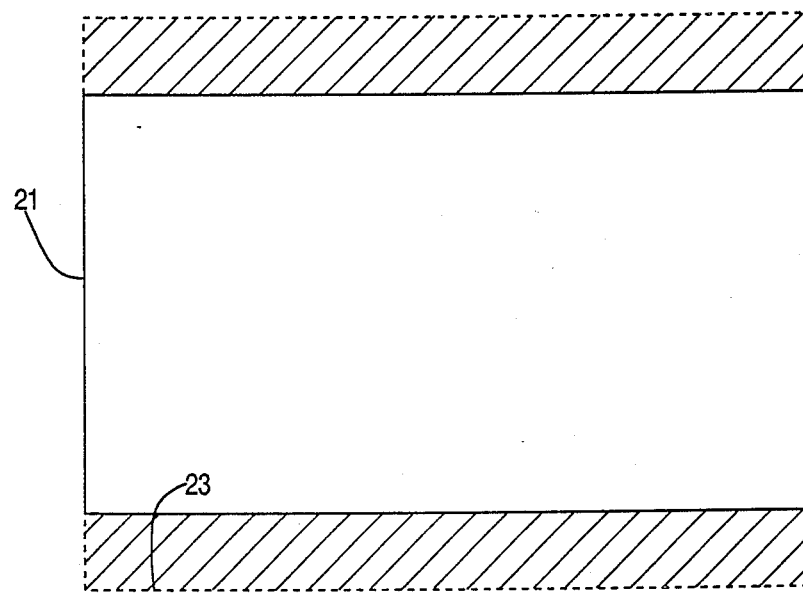

APPARATUS FOR RECEIVING AND SELECTING HIGH-DEFINITION TELEVISION (HDTV) SIGNALS AND STANDARD TELEVISION (NTSC) SIGNALS

BACKGROUND OF THE INVENTION

The present invention relates to a high-definition television receiver for reproducing a television image from high-definition television signals, and furthermore from, quasi-high-definition television signals which have been converted from television signals of a conventional standard television system.

The high-definition television (HDTV) system has been developed to incorporate a wide screen of greater size for a fine reproduction picture and thus to provide improved visual effects of vividness and presentation which cannot be obtained on a conventional standard television receiver. Nippon Hoso Kyokai (NHK) offers its high-definition television system featuring the aspect ratio (width to height) of a television screen of 5:3 or 16:9 (as will be described hereinafter with a ratio of 16:9) and the 1125 scanning lines, as compared to the 4:3 aspect ratio and 525 lines of the conventional standard television system.

This type of high-definition television system is briefly depicted in the report of T. Fujio, "High-definition Wide-screen Television System for the Future", IEEE Trans., vol. BC-26, No. 4, p. 113 (1980).

Also, there has been proposed a method in which a television image derived from television signals of the conventional standard television system (e.g. the N.T.S.C. system) can be received with equal success on a high-definition television receiver which is substantially designed for reproduction of high-definition television pictures upon receipt of high-definition television signals.

FIG. 1 shows the schematic arrangement of a circuit provided in a device for reproducing an image from television signals of the conventional standard television system with a prior art high-definition television receiver. A television signal of the conventional standard television system is input through a conventional standard television signal input port 11 and then converted into a quasi-high-definition television signal by a signal converter 12 as the scanning lines are doubled from 525 to 1050 by scanning conversion. There is a switch circuit 14 which selectively transmits either the converted television signal or a signal of the high-definition television system supplied through an input port 13 to a high-definition television display 15 for reproducing a televised image on its wide screen. FIG. 2 illustrates television images reproduced on the high-definition television display 15 from the quasi-high-definition signals converted from the conventional standard television signals. As shown in FIG. 2, the numeral 21 is a 16:9 aspect ratio screen of the high-definition television display while 22 and 23 represent areas of a 4:3 aspect ratio for reproduction of pictures from the quasi-high-definition television signals converted from the conventional standard television signals. There is a difference in aspect ratio between the two television systems and thus, a screen of a particular size will not correspond to both of the distinctly sized pictures of their respective systems. In the prior art, a high-definition television receiver is alternatively arranged so that a reproduction picture of the conventional standard television system can correspond to the high-definition television screen either in frame height, as shown in FIG. 2-a or in frame width, as shown in FIG. 2-b.

Accordingly as shown in FIG. 2-a, this type of a high-definition television receiver permits a reproduction picture 22 of the conventional standard television system to appear in a smaller size such that the high-definition television display screen 21 has non-scanned areas on both left and right ends (represented by oblique lines) thus being shortened in effective area. On the other hand, a high-definition television receiver shown in FIG. 2-b permits the same to appear in over-sized fashion with its upper and lower end portions situated off the screen 21 and thus to become imperfect in visual image.

SUMMARY OF THE INVENTION

It is a primary object of the present invention to provide a high-definition television receiver employing a high-definition television display on which a picture derived from television signals of the conventional standard television system can be reproduced by selecting a picture size corresponding to the characteristics of either FIG. 2-a or FIG. 2-b.

A high-definition television receiver according to the present invention employs a high-definition television display having a screen of different aspect ratio than that of a conventional standard television system for selectively displaying a television picture from television signals of either a conventional standard television system or a high-definition television system. This high-definition television receiver further comprises first means for converting a television signal of the conventional standard television system into a first quasi-high-definition television signal in reference to a vertical length of the screen of the high-definition television display, second means for converting it into a second quasi-high-definition television signal in reference to a horizontal length of the same, and switching means for selecting one of the high-definition television signal and the first and second signals for transmission to the high-definition television display.

Accordingly, the high-definition television receiver according to the present invention can provide an appropriate television picture of the conventional standard television system which, when containing no important information in both the upper and lower end portion thereof, is arranged having a horizontal length equal to the width of the high-definition television screen and also, being trimmed off at both the upper and lower end portions so as to become enlarged in the center as shown in FIG. 2-b and selected by the switching means. On the other hand, if the television picture of the conventional standard television system contains important information in the upper and lower end portions, it can be arranged having a vertical length equal to the height of the high-definition television screen and displayed in full size without any cutoff after being selected by the switching means, as shown in FIG. 2-a, while the screen has non-scanned areas in both the left and right ends. This allows the high-definition television screen of specific size to be effectively utilized through selecting the television picture according to its characteristics.

BRIEF DESCRIPTION OF THE DRAWINGS

FIG. 2 is an illustration showing television images of the conventional standard television system reproduced on a high-definition television display.

DETAILED DESCRIPTION OF THE INVENTION

One embodiment of the present invention in the form of a high-definition television receiver will be described with reference to the drawings.

Figure 1:
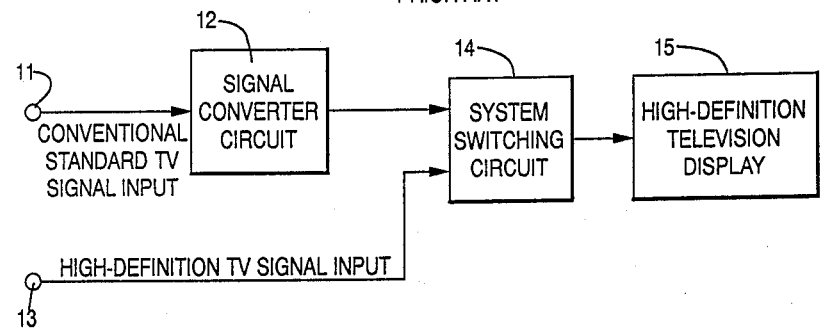
FIG. 1 is a block diagram of a prior art high-definition television receiver.
Figure 3:
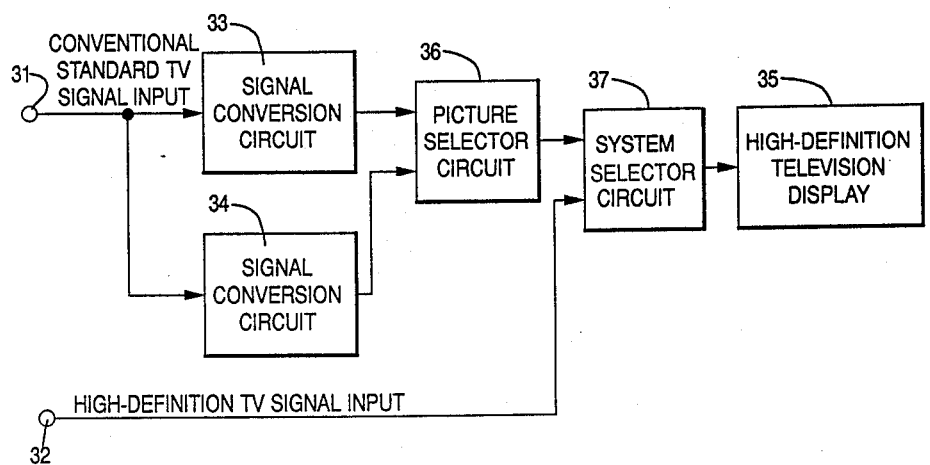
FIG. 3 is a block diagram of a high-definition television receiver showing one embodiment of the present invention.

FIG. 3 is a block diagram of the arrangement incorporated in the high-definition television receiver according to the present invention.

A television signal of the conventional standard television system is input through an input port 31 while a television signal of the high-definition television system is input through an input port 32, as shown in FIG. 3. There are a first signal converter circuit 33 for conversion of the conventional standard television signal to display a television picture derived from the television signal of the conventional standard television system on the screen of a high-definition television display 35 in such a manner as shown in FIG. 2-a, and a second signal converter circuit 34 for conversion of the signal to display a television picture derived from the conventional standard television signal on the high-definition television display 35 in such a manner as shown in FIG. 2-b. The output signals from the first and second signal converter circuits 33 and 34 are then transferred to a picture selector circuit 36 in which a selection is made between the conventional standard television pictures of FIG. 2-a and FIG. 2-b for reproduction on the television screen. There is also a system selector circuit 37 for choosing between the television pictures of the conventional standard television system and the high-definition television system by transmitting either the output signal from the picture selector circuit 36 or the television signal of the high-definition television system supplied through the input port 32 to the high-definition television display 35.

The first and second signal converter circuits 33, 34 will be described in detail. The first signal converter circuit 33 converts the input signal of the conventional standard television system into a first quasi-high-definition television signal for reproduction of a television image having the double scanning lines of 1050 and a vertical length equal to the height of the television screen of the high-definition television system. Also, the second signal converter circuit 34 converts the input signal of the conventional standard television system into a second quasi-high-definition television signal for reproducing of a television image having the double scanning lines of 1050 and a horizontal length equal to the width of the high-definition television screen. In both the first and second signal converter circuits 33, 34, known adjustments such as line alignment, field adjustment, motion control, or the like can also be made, other than the conversion of scanning lines and picture size.

As described above, the high-definition television receiver according to the present invention includes the first signal converter circuit 33 for display of the television image, which is derived from the conventional standard television signal thus having an aspect ratio different from that of the high-definition television system, in reference to the vertical length of a television screen, the second signal converter circuit 34 for display of the same in reference to the horizontal length of the television screen, and the picture selector circuit 36 for switching over the output signal, so that a television picture derived from the conventional standard television signal can be reproduced on the high-definition television display either at full screen size, thus providing an effect of impact, with both the upper and lower ends thereof trimmed off if it contains no important information at upper and lower ends or at slightly smaller size with the upper and lower ends thereof not trimmed off if it contains important information in those areas, and also, that a choice can be made between the two distinct picture sizes for effective use of the specific television screen of the high-definition television receiver.

What is claimed is:

1. An apparatus for receiving and selecting high-definition television signals and NTSC standard television signals, said apparatus comprising:
    a first input terminal for receiving the NTSC standard television signals;
    a second input terminal for receiving the high-definition television signals;
    a high-definition display screen device having a first aspect ratio of 16 to 9;
    the NTSC standard television signals corresponding to a second aspect ratio which is different than said first aspect ratio of said high-definition display screen device;
    a first signal converter, coupled to said first input terminal, for converting the NTSC standard television signals into first quasi-high-definition television signals identifying a first displayed image corresponding in vertical length to a vertical length of said high-definition display screen device;
    a second signal converter, coupled to said first input terminal, for converting the NTSC standard television signals into second quasi-high-definition television signals identifying a second displayed image corresponding in horizontal length to a horizontal length of the high-definition display screen device;
    first switching means, coupled to said first and second signal converters, for selecting and outputting one of said first and second quasi-high-definition television signals; and,
    second switching means, coupled to said first switching means and said second input terminal and said high-definition display screen device, for selecting and outputting to said high-definition display screen device one of said high-definition television signals and said one of said first and second quasi-high-definition television signals selected and outputted by said switching means.

* * * * *